March 9, 1965   C. W. EASTEP   3,172,250
TOOL
Filed Sept. 6, 1961
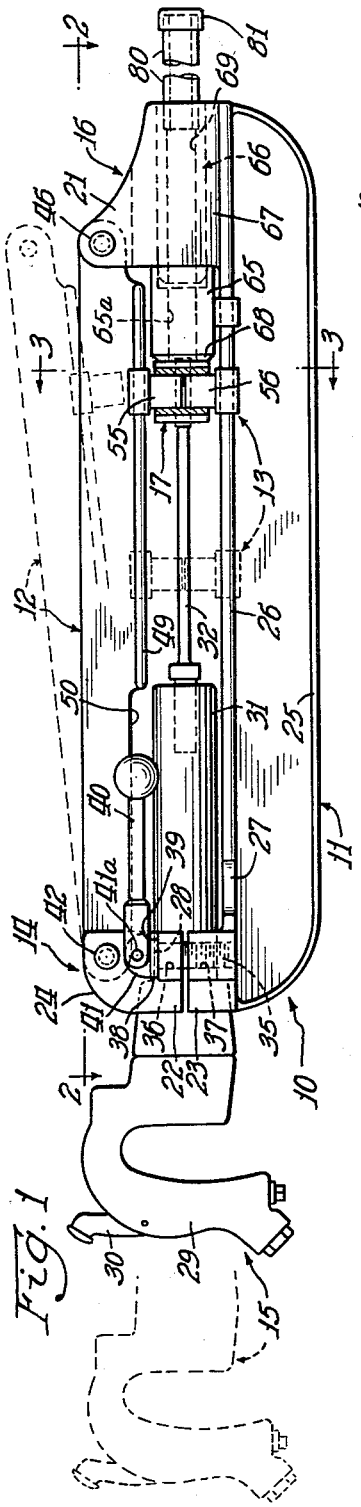
Inventor:
Calvin W. Eastep
By Evan D. Roberts atty.

United States Patent Office 3,172,250
Patented Mar. 9, 1965

3,172,250
TOOL
Calvin Walter Eastep, Trumansburg, N.Y., assignor to Morse Chain Company, Ithaca, N.Y., a corporation of New York
Filed Sept. 6, 1961, Ser. No. 136,353
11 Claims. (Cl. 59—7)

This application relates to an improved assembly and disassembly tool and in particular to a portable tool for assembling and disassembling power chains.

In the utilization of chains for transmitting power, it is oftentimes necessary to disassemble or assemble the chain to repair the chain or otherwise place it in operating condition. Inasmuch as such assembly or disassembly is often done on the job, it is usually an awkward and time consuming operation which, under many circumstances, could be very haphazard. This is particularly true in view of the fact that in the past such assembly and disassembly has been done manually or with some inadequate tool which is not necessarily designed for this purpose or which, if so designed, may be expensive, immobile, or incapable of adequately assembling and disassembling a large number of different size chains. It is, therefore, extremely desirable to provide a structure for assembling and disassembling power transmitting chains on the job. It is further highly desirable that such a machine be completely portable, economical to produce and maintain, easy to operate, and readily adaptable to various size chains.

It is an object of this invention to provide a portable tool having a relatively simple and economical construction for assembling and disassembling power transmitting chains.

Another object of this invention is to provide a portable tool for assembling and disassembling power transmitting chains which is adapted to utilize a standard pneumatic percussion tool for its motivating power.

A further object of this invention is to provide a portable tool for assembling and disassembling a power transmitting chain which is readily adaptable to position and hold a great number of different sized chains to be assembled or disassembled thereby.

Another object of this invention is to provide a portable tool for assembling and disassembling power transmitting chains which is readily attached and detached from the chain.

It is a more particular object of the present invention to provide an improved assembly and disassembly tool for power transmitting chains having means effective to position a chain with respect to additional means for effecting the removal of a pin from the chain, or for effecting the replacement of such a pin.

Other objects, advantages, and novel aspects of the invention will become apparent upon the following detailed description in conjunction with the accompanying drawings wherein:

FIG. 1 is a side view of the portable assembly and disassembly tool showing the general relationship of the components of the tool.

FIG. 2 is a top view of the portable assembly and disassembly tool, taken along line 2—2 of FIG. 1, showing the position of the chain with respect to the tool.

FIG. 3 is a sectional view taken along line 3—3 of FIG. 1 showing the chain held in position by chain holders.

FIG. 4 is a partial top view of the portable assembly and disassembly tool showing a chain in position to have the connecting pin removed therefrom.

FIG. 5 is a partial view of the portable assembly and disassembly tool showing a connecting pin in position to be inserted in the chain.

Referring now to the figures, and more particularly to FIG. 1, there is illustrated a preferred embodiment of the chain assembly and disassembly tool, generally indicated by the numeral 10. The tool 10 generally includes a base 11, a clamping bar 12 pivotally connected to the base 11, a chain positioning assembly 13 slidably mounted on the clamping bar 12 and the base 11, a clamp 14 formed on one end of the base 11, a pneumatic percussion hammer 15 adjustably secured in the clamp 14, and a stop assembly 16 positioned on the other end of the base 11 in alignment with the hammer 15. The chain to be assembled or disassembled by the tool 10 is generally designated by the numeral 17 (FIG. 1) for a single strand chain, and 17a (FIG. 4) for a multi-strand chain.

The stop assembly 16 is provided with brackets 21. The clamp 14 is a circular one-piece clamp formed as part of the base 11. The clamp 14 terminates in an upper jaw 22 and a lower adjacent jaw 23 and is provided with a pair of brackets 24. The base 11 is provided with laterally extending flanges 25 on the bottom and ends thereof. A pair of laterally extending upper flanges 26 are provided on the base 11 at the top thereof between the stop assembly 16 and the lower clamp jaw 23. The upper flanges 26 are relieved at 27 to facilitate the insertion of the chain positioning assembly 13 as will henceforth be fully described. The clamp 14 is provided with an internal cylindrical clamping surface 28 which is adapted to slidably receive the pneumatic percussion hammer 15.

The pneumatic hammer 15 is of a conventional design and operation, and consists generally of a handle 29, a trigger 30, and a barrel 31. The barrel 31 is adapted to slidably rest in the clamping surface 28 of the clamp 14 so that the hammer 15 may be held by the clamp 14. A variety of working tools are adapted to be received in the end of the barrel 31 and in turn transmit the pulsating blows provided by the impulsive action of the hammer 15 when the trigger 30 is depressed. These tools are illustrated, for the purposes of this invention, as either a disassembling or extracting pin 32 (FIGS. 1 and 4) or as an assembly or coupling pin 33 (FIG. 5).

A clamping screw 35 is provided as part of the clamp 14 and is rotatably mounted in a passage 36 in the upper jaw 22 and threadably mounted in an aligned threaded passage 37 in the lower jaw 23. The screw 35 is provided with a head flange 38 adapted to engage an upper surface 39 of the upper jaw 22. When the screw 35 is threaded into the lower jaw 23, the head flange 38 will urge the upper jaw 22 toward the lower jaw 23 to clamp the hammer 15 in place.

A clamp tightening handle 40 is pivotally mounted on a semi-circular extension 41 of the screw 35 by means of a pin 41a so as to be rotatable about the pin 41a through a 180° arc (FIG. 1). It should be noted that by rotating the handle 40 clockwise or counterclockwise (FIG. 2) the screw 35 will be correspondingly rotated. Further, by an alternate combination of vertical rotations (FIG. 1) and horizontal rotations (FIG. 2), the handle 40 may be manipulated to cause the screw 35 to thread into or out of the lower clamp jaw 23 to tighten or loosen the clamp 14 respectively so as to hold or release the pneumatic hammer 15.

The clamping bar 12 is pivotally secured to the brackets 24 by a quick release pin 42 inserted through passages 43 in the brackets 24 and the clamping bar 12. The right end of the clamping bar 12 (FIGS. 1 and 2) is adapted to be positioned between the brackets 21 and is held in position by a pin 46 which is inserted through passages 47 in the clamping bar 12 and the brackets 21.

Clamp bar 12 may be pivoted about either pin 42 or 46 by removing the other pin. A pair of flanges 49 extend laterally from the clamping bar 12 and are relieved at 50 to facilitate insertion of the chain positioning assembly 13 as will henceforth be fully described.

The positioning assembly, generally designated by the numeral 13, is adapted for gripping and positioning the chain 17 between the clamping bar 12 and the tool base 11. The positioning assembly 13 comprises an upper jaw 55 and a lower jaw 56 which are interchangeable. The upper and lower jaws 55 and 56 are provided with guides 57 and 58 respectively. The guides 57 and 58 are formed so as to encircle the edges of the longitudinal flanges 49 of the clamping bar 12 and the upper flanges 26 of the base 11 respectively and are adapted to slidably engage the respective flanges 26 and 49. The upper and lower jaws 55 and 56 of the positioning assembly are thereby restrained to longitudinal movement along the laterally extending flanges 26 and 49 of the tool base 11 and the clamping bar 12 respectively.

It should be noted that the lateral flanges 49 and 26 of the clamping bar 12 and the tool base 11 act as a track for slidably supporting the upper and lower chain gripping jaws 55 and 56 and to allow the jaws 55 and 56 to be selectively positioned along the track. It should also be noted that the clamping bar flanges 49 and base flanges 26 are relieved at 50 and 27 respectively so as to facilitate mounting the chain positioning assembly jaws 55 and 56 on the respective flanges 49 and 26 as previously indicated.

Each chain gripping jaw 55 and 56 is provided with a sries of three opposed cylindrical recesses 59 and 60 respectively to receive rollers 61 of the chain 17. The chain 17 is thereby held in position between the clamping bar 12 and the tool base 11 (FIG. 3) when the clamping bar is in position between the brackets 21. Although the chain 17 illustrated in FIG. 3 is a roller chain, it should be noted that the chain gripping jaws 55 and 56 would function equally well to engage bushings or pins of a similar chain and thereby position the similar chain with equal facility in the event the chain were of the type having bushings or pins instead of the rollers.

The chain gripping jaws 55 and 56 have longitudinal dimension which is less than the distance between inner link plates 62 of the chain 17 so as to allow the chain gripping jaws 55 and 56 to directly engage the chain bushings or rollers 61. The chain is also provided with outer links 62a for interconnecting the inner links 62. Passages 63 are provided in the inner and outer links 62 and 62a for receiving connecting pins 64.

The stop assembly 16 includes a width adapter 65 (FIGS. 1 and 4) which is slidably mounted on the track 26. The adapter 65 is provided with a passage 65a in alignment with barrel 31 of the percussion hammer 15. A passage 66 is provided in a stationary stop portion 67 which is in alignment with the passage 65a and the barrel 31 of the percussion hammer 15. The width adapter 65 is provided with a head 68 which is adapted to engage the outer link 62a and thereby hold the links 62 and 62a against movement to the right (FIGS. 1 and 4). An insert 66 is secured in the stop assembly 20 and is provided with a passage 69 in alignment with barrel 31 of the percussion hammer 15. A collecting stop 80 is screwed, or otherwise affixed in some readily removable manner, into the passage 69 in the insert 66 to receive extracted chain pins. A cap 81 is attached to the collecting stop 80 to prevent an extracted chain pin from being driven away from the tool area.

The longitudinal passage 69 in the fixed insert 66 allows the pin 64 of the chain 17 to be forced from the links 62 and 62a to the right into the passage 69 while the head 68 of the width adapter 65 retains the chain 17 against longitudinal movement to the right (FIG. 1). The width adapter 65 will also hold the chain 17 against longitudinal movement to the right so that the pin 64 may be driven into the chain 17 to assemble the chain. In this latter instance the pin 64 will be driven to the right to a point slightly beyond the rightmost extremity of the chain 17 (FIGS. 1 and 4) so that the pin 64 may be secured to the outer link 62.

The disassembly or extractor pin 32 (FIGS. 1 and 4) is utilized in the hammer 15 for forcing the chain pin 64 from the chain links 62 and 62a to disassemble the chain 17. The extractor pin 32 is mounted in the percussion hammer 15 so as to be actuated thereby, and is of a lesser diameter than the chain pin 64 so as to pass freely through the chain link openings 63 as the chain pin 64 is driven from the chain 17 by the disassembly pin 32.

The assembling or coupling pin 33 (FIG. 5) is utilized for driving a chain pin 64 into the chain 17 to assemble the chain. The assembly pin 33 is provided with a socket 70 to frictionally receive and hold the chain pin 64 in alignment with the pin passages 63 in the links 62 and 62a to which the pin 64 is to be applied. The assembling pin 33 is further adapted to be retained in the percussion hammer 15 and thereby driven to the right (FIG. 5) to force the chain pin 64 into the passages 63 of the chain 17 to assemble the chain. It should be noted that either the disassembling pin 32 or the assembling pin 33 may be mounted in the pneumatic percussion hammer 15 to either disassemble or assemble the chain 17 depending on the operation desired.

*Operation*

In the operation of the tool 10 to disassemble a chain 17, the pin 42 or 46 is removed from the clamping bar 12 and the brackets 24 or 21 respectively, and the clamping bar 12 is pivoted about the pin 46 or 42 to open the tool. A chain positioning assembly 13 is selected which has jaws 55 and 56 complementing cylindrical recesses 59 and 60 which will fit between the inner links 62 and engage the rollers 61 respectively when the jaws 55 and 56 are brought together (FIGS. 1 and 3). The upper and lower positioning jaws 55 and 56 are positioned in the relieved portions 50 and 27 of the flanges 49 and 26 respectively. The jaws 55 and 56 are then slidably positioned on the flanges 49 and 26 respectively by moving the jaws 55 and 56 so that the guides 57 and 58 engage the flanges 49 and 26 respectively.

The chain 17 is then placed in the lower jaw 56 and the lower jaw 56 and the chain 17 are moved against the head 68 of the width adapter 65, or left end of the fixed insert 66 when adapter 65 is not used (FIG. 1). The clamping bar 12 is thereupon rotated into position immediately above the brackets 21, and the upper jaw 55 of the chain holding assembly 13 is positioned on the flange 49, over the chain 17 and between the inner links 62. After the upper jaw is thus positioned on the flange 49, the clamping bar 12 is rotated to the closed position between the brackets 21 or 24 (FIG. 1) and the pin 42 or 46 is inserted through the passages 43 or 47 in the clamping bar 12 and the brackets 21 or 24. The chain 17 is thus clamped between the upper and lower jaws 55 and 56 of the positioning assembly 13 and in abutting engagement with the width adapter 65 or fixed insert 66.

A disassembly pin 32 is selected which has a diameter less than that of the pin passages 63 in the inner and outer chain links 62 and 62a. The disassembly pin 32 is mounted in the pneumatic hammer 15 and the barrel 31 of the pneumatic hammer 15 is positioned in the clamping surface 28 of the clamp 14. The hammer 15 is then moved to the right until the disassembly pin 32 engages the chain pin 64 (FIG. 1). Inasmuch as the limits of position of the hammer 15, in the clamp 14 are determined by the length of the hammer barrel 31, it is possible to position the disassembly pin 32 in engagement with the chain pin 64 by using the proper width adapter 65 or by omitting the adapter 65 as required when a very wide or a very narrow chain 17 is positioned between the jaws 55 and 56 of the positioning assembly 13.

More particularly, when a wide multi-strand chain is positioned in the positioning assembly 13, with the disassembly pin 32 in engagement with the chain pin 64, the rightmost end of the hammer barrel 31 (FIG. 1) may be prevented from entering the clamp 14. Conversely, when an extremely narrow chain is positioned in the positioning assembly 13, the expanded hammer handle 29 may prevent the hammer 15 from moving sufficiently far enough to the right in the clamp 14 (FIG. 1) so as to cause the disassembly pin 32 to engage the chain pin 64. Therefore, when either a very wide or a very narrow chain 17 is positioned in the positioning assembly 13, it is necessary to insert the proper width adapter 65 on the flange against the fixed bushing 66 so as to appropriately position the chain 17 and the positioning assembly 13, which are moved to the right against the head 68 of width adapter 65 or fixed bushing 66 (FIG. 1). This allows appropriate positioning of the hammer 15 in the clamp 14 to position the disassembly pin 32 in engagement with the chain pin 64.

After the chain 17 and the positioning assembly 13 are positioned by the width adapter 65, and the pneumatic hammer 15 is positioned in the clamp 14 with the disassembly pin 32 in engagement with the chain pin 64, the hammer is secured in place by the clamp 14.

To secure the hammer 15 in the clamp 14, the clamp tightening handle 40 is alternately rotated clockwise in a vertical plane about the pin 42 (FIG. 1) and then counterclockwise in a horizontal plane about the axis of the clamping screw 35 (FIG. 2) to cause the clamping screw 35 to draw the upper clamp jaw 22 towards the lower clamp jaw 23. This movement will cause the clamping surface 28 of the clamp 14 to grip the barrel 31 of the hammer 15 and hold the hammer in position in the clamp 14 with the disassembly pin 32 in position in engagement with the chain pin 64.

The pneumatic hammer 15 is thereupon actuated by the trigger 30 which causes the disassembly pin to be impulsively actuated to the right (FIG. 1) with the result that the disassembly pin 32 will drive the chain pin 64 from the chain 17 into the passage 69 of the fixed bushing 66. Thus, the chain pin 64 is removed from the chain 17 to disassemble the chain. In the event that the length of the stroke of the hammer 15 is insufficient to completely remove the connecting pin 64 in one stroke, the hammer 15 may be repositioned closer to the chain by manipulating the clamping handle 40 and the screw 35 to release the hammer 15, repositioning the hammer closer to the chain to utilize the stroke, and finally reclamping the hammer 15 in clamp 14 by appropriately manipulating the clamping handle 40 and the screw 35. Once the chain 17 is disassembled, the chain may be removed from the tool 10 by removing the pin 42 or 46 from the passages 43 and 47 in the clamping bar 12 and the bracket 21 or 24. The clamping bar is then pivoted counterclockwise about the pin 42 or 46 (FIG. 1) to open the assembly and disassembly tool 10 to allow removal of the chain.

In the operation of the tool 10 to assemble a chain 17, the chain 17 may be restrained in position in the positioning assembly after the pin 64 is removed. In the event that only assembly is desired, the chain 17 to be assembled may be positioned between the positioning assembly jaws 55 and 56 in the same manner as the chain 17 was positioned therebetween for the disassembly operation above described.

More particularly, a chain 17 to be assembled will be positioned between the jaws 55 and 56 without the chain pin 64 and with the inner and outer links 62 and 62a positioned to align pin passages 63 in the inner and outer lengths so that a connecting pin 64 may be inserted therethrough to connect the links held in the positioning assembly 13. Also, the proper size width adapter 65 to be positioned so that the chain 17 to be assembled will be appropriately positioned a predetermined distance from the hammer 15.

An assembly or coupling pin 32 is chosen which has a socket 70 (FIG. 5) having a diameter equal to that of the chain pin 64 to be placed in the chain 17 to be assembled. The pin 64 is placed in the socket 70 of the assembly pin 33 and the assembly pin 33 is positioned in the pneumatic hammer 15. The pneumatic hammer is clamped in the clamp 14, in the manner above described in the disassembly operation, so that the pin 64 is positioned adjacent the pin passage 63 in the leftmost outer chain link 62a (FIG. 1).

The pneumatic hammer is thereupon actuated so as to impulsively drive the assembly pin 33 and the chain pin 64, held in the assembly pin 33, to the right into the pin passages 63 in the inner and outer chain links 62 and 62a and the roller 61 of the chain 17. The hammer 15 is continuously actuated until the pin 64 is positioned in the chain 17 (FIG. 1) with a portion of the ends thereof extending on either side of the chain. The chain 17 is thereby assembled and may be lifted or otherwise removed from the positioning assembly after removing the pin 42 or 46 and rotating the clamp bar 12 to raise the upper jaw 55 from clamping engagement with the chain. In the event that the stroke of the hammer 15 is insufficient to completely insert the connecting pin 64, the hammer may be repositioned in the clamp 14 as previously described.

Although the operation was described with reference to a single strand roller chain (FIGS. 1 and 2), it should be recognized that a multi-strand chain 17a may be readily positioned in a positioning assembly 13 having a series of upper and lower jaws 55 and 56 for supporting the chain 17a. The operation of assembly and disassembly in this instance will be similar to that above described with the only difference in disassembly. More particularly, when the insertion length of pin 32 is used up in disassembly, the hammer 15 and pin 32 are retracted, an undersize straight pin is inserted in the chain 17a, and hammer 15 with pin 32 are repositioned for operation.

What is claimed is:

1. A device for assembling and disassembling power transmitting chains of the type which have adjacent links thereof pivotally connected by pins inserted in aligned pin passages of the adjacent links and which can be inserted in or extracted from the aligned passages for respectively assembling or disassembling the chain comprising, a base, a lower track formed longitudinally on said base, an upper track pivotally mounted on said base and adapted to be rigidly secured in position parallel to said base track, means slidably mounted on said upper and lower tracks and adapted for engaging and longitudinally positioning adjacent links of said chain on said base, an automatic hammer, a pin mounted in said hammer and adapted to receive a connecting pin, a connecting pin inserted in said hammer mounted pin to be axially driven by said hammer, a clamp for adjustably securing said hammer to said base with the axis of said pin in alignment with the axis of the link passages, a stop secured to said base for holding said chain against movement away from said hammer, and means for actuating said hammer to drive said connecting pin into the aligned link passages for inserting said connecting pin therein to assemble the chain.

2. A device for assembling and disassembling power transmitting chains of the type which have adjacent links thereof pivotally connected by pins inserted in aligned pin passages of the adjacent links and which can be inserted in or extracted from the aligned passages for respectively assembling or disassembling the chain, comprising, a base, a lower track formed longitudinally on said base, an upper track pivotally mounted on said base and adapted to be rigidly secured in position parallel to said base track, means for engaging and positioning adjacent links of said chain on said base; said positioning means including an upper jaw slidably mounted on said upper track and adapted for receiving the upper half of the adjacent links to be disassembled to position said links, and a lower jaw slidably mounted on said lower track and adapted for receiving the lower half of the adjacent links to be disassembled to position said links; an automatic hammer, a pin mounted in said hammer and adapted to be axially driven by said hammer, a clamp for adjustably securing said hammer to said base with the axis of said pin in alignment with the axis of the link passages, a stop secured to said base for holding said chain against movement away from said hammer, and means for actuating said hammer to drive said pin into the aligned link passages for engaging a connecting pin therein to remove the connecting pin to disassemble the chain.

3. A device for assembling and disassembling power transmitting chains of the type which have adjacent links thereof pivotally connected by pins inserted in aligned pin passages of the adjacent links and which can be inserted or extracted from the aligned passages for respectively assembling or disassembling the chain, comprising, a base, means for positioning adjacent chain links on said base, an automatic hammer having a cylindrical body portion, a pin mounted in said hammer parallel to the axis of the cylindrical body portion of said hammer, said pin being adapted to receive a connecting pin, a connecting pin inserted in said hammer mounted pin to be axially driven by said hammer, a clamp formed on said base having a cylindrical clamping surface for adjustably receiving said hammer along the cylindrical body portion thereof for selectively securing said hammer to said base with the axis of said cylindrical body portion in alignment with the axis of the link passages, and means for actuating said hammer to drive said connecting pin into the aligned link passages for inserting said connecting pin therein to assemble the chain.

4. A device for assembling and disassembling power transmitting chains of the type which have adjacent links thereof pivotally connected by pins inserted in aligned pin passages of the adjacent links and which can be inserted in or extracted from the aligned passages for respectively assembling or disassembling the chain, comprising, a base, a lower track formed longitudinally on said base, an upper track pivotally mounted on said base and adapted to be rigidly secured in position parallel to said lower track, means slidably mounted on said upper and lower tracks and adapted for engaging and longitudinally positioning adjacent links of said chain on said tracks, an automatic hammer having a cylindrical body portion, a pin mounted in said cylindrical hammer body portion parallel to the axis of the cylindrical body portion, said pin being adapted to be axially driven by said hammer, a clamp formed on said base having a cylindrical clamping surface for adjustably receiving and clamping said cylindrical body portion of said hammer in position parallel to said tracks with said pin in alignment with the axis of the aligned link passages, a stop secured to said base holding said chain against movement away from said hammer, and means for actuating said hammer to drive said pin into the aligned link passages for engaging a connecting pin therein to remove the connecting pin to disassemble the chain.

5. A device for assembling and disassembling power transmitting chains of the type which have adjacent links thereof pivotally connected by pins inserted in aligned pin passages of the adjacent links and which can be inserted or extracted from the aligned passages for respectively assembling or disassembling the chain, comprising, a base, a lower track formed longitudinally on said base, an upper track pivotally mounted on said base and adapted to be releasably secured to said base in position parallel to said base track, a lower jaw slidably mounted on said lower track, said lower jaw being adapted for receiving and supporting the lower portion of the chain to position the adjacent links with the respective pin passages thereof in alignment, an upper jaw slidably mounted on said pivoted upper track, said upper jaw being adapted for receiving and holding the upper portion of the chain, an automatic hammer, a pin mounted in said hammer and adapted to receive a connecting pin, a connecting pin inserted in said hammer mounted pin to be axially driven by said hammer, a clamp for adjustably securing said hammer to said base with the axis of said pin in alignment with the axis of the link passages, a stop formed on said base for preventing longitudinal movement of said upper and lower jaws away from said hammer on said respective tracks, and means for actuating said hammer to drive said connecting pin into the aligned link passages for inserting said connecting pin therein to assemble the chain.

6. A device for assembling and disassembling power transmitting chains of the type which have adjacent links thereof pivotally connected by pins inserted in aligned pin passages of the adjacent links and which can be inserted in or extracted from the aligned passages for respectively assembling or disassembling the chain, comprising, a base, a lower track formed longitudinally on said base, an upper track pivotally mounted on said base and adapted to be releasably secured to said base in position parallel to said base track, a lower jaw slidably mounted on said lower track, said lower jaw being adapted for receiving and supporting the lower portion of said chain to position the adjacent links with the respective pin passages thereof in alignment, an upper jaw slidably mounted on said pivoted upper track, said upper jaw being adapted for receiving and holding the upper portion of the chain, an automatic hammer having a cylindrical body portion, a pin mounted in said hammer parallel to the axis of the cylindrical body portion of said hammer, said pin being adapted to be axially driven by said hammer, a clamp formed on said base having a cylindrical clamping surface for adjustably receiving said hammer along the cylindrical body portion thereof for selectively securing said hammer to said base with the axis of said cylindrical body portion in alignment with the axis of the link passages, a stop formed on said base for preventing longitudinal movement of said upper and lower jaws on said respective tracks away from said hammer, and means for actuating said hammer to drive said pin toward said stop and into the aligned link passages for engaging a connecting pin therein to remove the connecting pin to disassemble the chain.

7. A device for assembling roller chains of the type having adjacent links thereof pivotally connected by connecting pins inserted in aligned pin passages of adjacent chain links wherein the connecting pins can be inserted in the aligned passages for assembling the chain, comprising, a base, means for engaging and positioning adjacent links from said chain on said base; said positioning means including an upper jaw slidably mounted on said engaging means and adapted for receiving the upper half of the rollers and for engaging the upper surface of said adjacent links to position said rollers and links with the passages thereof in alignment, and a lower jaw slidably mounted on said base and adapted for receiving the lower half of the rollers and for engaging the lower surface of said adjacent links to position said rollers and links with the passages thereof in alignment, an automatic hammer actuatable for axially driving pins, an assembly pin mounted in said hammer to be axially driven by said hammer and adapted to receive a connecting pin, a clamp for adjustably securing said hammer to said base with the axis of said pins in alignment with the axis of the link passages, and means for actuating said hammer to drive said assembly pin to insert said connecting pin into the aligned link passages to pivotally connect the adjacent links.

8. A device for assembling power transmitting chains of the type having adjacent links thereof pivotally connected by connecting pins inserted in aligned pin passages of adjacent chain links and which can be inserted in the aligned passages for assembling the chain, comprising, a base, means for positioning the chain links in adjacent positions on said base with the pin passages of the respective links in alignment, an automatic pulsating hammer actuatable for axially driving pins, an assembling pin mounted in said hammer to be axially driven by said hammer and adapted to receive a connecting pin adapted to be axially driven by said assembling pin, a clamp for adjustably securing said hammer to said base with the axis of said assembling and connecting pins in alignment with the axis of the link passages, and means for actuating said hammer to drive said assembling pin to insert said connecting pin into the aligned link passages to pivotally connect the adjacent links.

9. A device for disassembling power transmitting chains of the type having adjacent links thereof pivotally connected by connecting pins inserted in aligned passages of adjacent chain links wherein the connecting pins may be extracted from the aligned passages for disassembling the chain, comprising, a base, a lower track formed longitudinally on said base, an upper track pivotally mounted on said base and adapted to be rigidly secured in a position parallel to said base track, means slidably mounted on said upper and lower tracks and adapted for engaging and longitudinally positioning adjacent links of said chain on said base, an automatic pulsating hammer actuatable for axially driving pins, a pin mounted in said hammer and adapted to be axially driven by said clamp formed on said base for adjustably securing said hammer to said base with the axis of said pin in alignment with the axis of the link passages, a stop secured to said base for holding said chain against movement away from said hammer, means actuating said hammer for driving said pin into engagement with said connecting pin to remove said connecting pin and thereby disassemble the chain.

10. A device for disassembling power transmitting chains of the type having adjacent links thereof pivotally connected by connecting pins inserted in aligned passages of adjacent chain links wherein the connecting pins may be extracted from the aligned passages for disassembling the chain, comprising, a base; a lower track formed longitudinally on said base; an upper track pivotally mounted on said base and adapted to be rigidly secured in a position parallel to said base track; means for engaging and positioning adjacent links of said chain on said base; said positioning means including an upper jaw slidably mounted on said upper track and adapted for receiving the upper half of the adjacent links to be disassembled to position said links, and a lower jaw slidably mounted on said lower track and adapted for receiving the upper half of the adjacent links to be disassembled to position said links; an automatic pulsating hammer actuatable for axially driving pins; a pin mounted in said hammer and adapted to be axially driven by said hammer; a clamp formed on said base for adjustably securing said hammer to said base with the axis of said pin in alignment with the axis of the link passages; a stop secured to said base for holding said chain against movement away from said hammer; means actuating said hammer for driving said pin into engagement with said connecting pin to remove said connecting pin and thereby disassemble the chain.

11. A device for disassembling power transmitting chains of the type having adjacent links thereof pivotally connected by connecting pins inserted in aligned passages of adjacent chain links wherein the connecting pins may be extracted from the aligned passages for disassembling the chain, comprising, a base; a lower track formed longitudinally on said base; an upper track pivotally mounted on said base and adapted to be rigidly secured in a position parallel to said base track; means for engaging and positioning adjacent links of said chain on said base; said positioning means including an upper jaw slidably mounted on said upper track and adapted for receiving the upper half of the adjacent links to be disassembled to position said links, and a lower jaw detachably slidably mounted on said lower track and adapted for receiving the upper half of the adjacent links to be disassembled to position said links; an automatic pulsating hammer actuatable for axially driving pins; a pin mounted in said hammer and adapted to be axially driven by said hammer; a clamp formed on said base for adjustably securing said hammer to said base along the axis of said pin with the axis of said pin in alignment with the axis of the link passages; a stop secured to said base for holding said chain against movement away from said hammer; means actuating said hammer for driving said pin into engagement with said connecting pin to remove said connecting pin and thereby disassemble the chain.

References Cited in the file of this patent

UNITED STATES PATENTS

| | | |
|---|---|---|
| 1,386,372 | Singer et al. | Aug. 2, 1921 |
| 2,091,844 | Blake | Aug. 31, 1937 |
| 2,256,718 | Krieter | Sept. 23, 1941 |

FOREIGN PATENTS

| | | |
|---|---|---|
| 275,768 | Great Britain | Aug. 18, 1927 |